United States Patent [19]

Putrino et al.

[11] Patent Number: 4,914,579
[45] Date of Patent: Apr. 3, 1990

[54] APPARATUS FOR BRANCH PREDICTION FOR COMPUTER INSTRUCTIONS

[75] Inventors: Michael Putrino, Endicott; Stamatis Vassiliadis, Vestal; Ann E. Huffman, Johnson City; Agnes Y. Ngai, Endwell, all of N.Y.

[73] Assignee: International Business Machines Corporation, Armonk, N.Y.

[21] Appl. No.: 157,474

[22] Filed: Feb. 17, 1988

[51] Int. Cl.⁴ .......................... G06F 9/00; G06F 9/32
[52] U.S. Cl. ................... 364/200; 364/261.3; 364/261.5; 364/938; 364/938.1
[58] Field of Search ... 364/200 MS File, 900 MS File

[56] References Cited

U.S. PATENT DOCUMENTS

| | | | |
|---|---|---|---|
| 3,418,638 | 12/1988 | Anderson et al. | 364/200 |
| 3,551,895 | 12/1988 | Driscoll, Jr. | 364/200 |
| 3,649,817 | 3/1972 | Keller et al. | 235/153 |
| 4,062,058 | 12/1977 | Haynes | 364/200 |
| 4,200,927 | 4/1980 | Hughes et al. | 364/200 |
| 4,224,680 | 9/1980 | Miura | 364/738 |
| 4,430,706 | 2/1984 | Sand | 364/200 |
| 4,439,827 | 3/1984 | Wilkes | 364/200 |
| 4,725,947 | 2/1988 | Shonai et al. | 364/200 |
| 4,837,681 | 6/1989 | Moller et al. | 364/200 |

OTHER PUBLICATIONS

Computer Arithmetic, Kai Hwang, 1979, pp. 98–101.
Integrated Electronics: Analog and Digital Circuits and Systems, Jacob Millman and Christos C. Halkias, 1972, pp. 599–602.
IBM 370 Assembly Language with Assit, Structured Concepts, and Advanced Topics, Charles J. Kacmar, 1988, pp. 208–210.
214 USPQ in Re Abele and Marshall, pp. 682–691.
IBM Technical Disclosure Bulletin, vol. 28, No. 9, Feb. 1986, Early Resolution of BXLE and BXH Instructions without Addition.

*Primary Examiner*—Gareth D. Shaw
*Assistant Examiner*—Gopal C. Ray
*Attorney, Agent, or Firm*—Baker, Maxham, Jester & Meador

[57] ABSTRACT

An apparatus for branch prediction for computer instructions predicts the outcome of an executing branch instruction in response to instruction operands Q, R, and B. The apparatus includes combinatorial logic for predicting a first branch condition, $((Q+R)-B)>0$, or a second branch condition $((Q+R)-B)\leq 0$.

6 Claims, 10 Drawing Sheets

APPARATUS FOR BRANCH PREDICTION FOR COMPUTER INSTRUCTIONS

FIELD OF THE INVENTION

The present invention relates to the field of digital computers. More specifically, the present invention relates to the prediction of branching conditions for branching instructions executed by such a computer.

BACKGROUND OF THE INVENTION

The performance of a computer is greatly affected by the speed at which a branch instruction may be executed. As is known, computers execute multipath instruction sequences, with a path selected at a node represented by a branch instruction. Path selection is based upon execution of the branch instruction. Branch instruction execution requires the comparison of operands within the computer to determine whether a branch is taken or not. The sooner the outcome can be determined, the better the performance of the computer.

A key element in determining whether a branch is to be taken or not is the comparison of operands on which the branch condition is contingent. Although the comparison of operands is a key element in other instruction types, branching is an important aspect of computer operation.

Generally, a branch instruction operation is performed by the arithmetic/logic unit of a computer according to a known procedure. A branching instruction includes three fields. One field indicates a register, R3, which contains an increment. A second field indicates a register, R1, containing the current value of an index. A third field indicates a branch destination. The instruction is executed by algebraically combining the increment in R3 with the current value in R1, and comparing the incremented current value against a compare value. If the R3 field is even, an even-odd pair of registers (R3 and R3+1) is understood, containing the increment and compare values, respectively. If the R3 field is odd, R3 contains both the increment and the compare value. In one type of branching instruction, a branch to the branch destination is taken when the incremented current value is higher than the final value. In another, the branch occurs when the incremented current value is less than or equal to the compare value.

There are many branch instructions that operate using these basic procedures. However, the instructions may be classified into two broad categories. The first category of instructions includes those where the branch is taken when the incremented current value is greater than the compare value. The other category of instructions are where the branch is taken when the incremented current value is less than or equal to the compare value.

The traditional method of determining the outcome of the two categories of branch instructions is to perform the increment operation, subtract the compared value from the increment result, and determine if the result of the subtraction is greater than, less than, or equal to zero. Depending on this determination, the branch is either taken or not. Therefore, in the prior art, determining whether the branch will be taken must wait until the increment and compare operations are completed. In most machines, these operations require two machine cycles. It is an objective of the present invention to reduce the time required for the determination of a branch condition, or other condition depending upon a similar comparison of operands.

SUMMARY OF THE INVENTION

The described embodiments of the present invention provide for the prediction, in a computer, of the validity of a branch condition BC, which is then used by the computer to perform other operations such as branching. The prediction is based upon three operands: current operand Q value, an increment operand R, and a comparison value operand B. Because the invention determines a branch condition directly from these three operands, the outcome may be computed concurrently with incrementation of the first operand during execution of the branching instruction. In addition, the requirement for subtraction of the comparison value from the increment result is eliminated because the comparison result is not required to perform the prediction. Because the prediction is made by the invention, branch determination may be made in one machine cycle.

The present invention includes a combinational logic circuit which determines whether the combination of operands provided to the logic circuit will result in a branch, or not. The combinational circuit eliminates the prior art steps of adding and comparing by combining selected signal and magnitude bits of Q, R, and B to directly obtain the predicted branch condition BC. The combinational circuit of the invention provides a predicted BC for two types of branching instructions.

BRIEF DESCRIPTION OF THE DRAWINGS

These and other objects, features and advantages of the invention will be more fully appreciated with reference to the accompanying figures, in which.

DETAILED DESCRIPTION

The operational context of the invention is exemplified by a computer system which executes branching instructions of a type described in the background above. The computer system includes an arithmetic/logic unit for performing arithmetic and logical operations which support instruction execution. The invention operates in response to the three operands upon which execution of the branching instructions are based, namely: the current value operand, Q, the increment operand, R, and the compare value operand, B. For convenience, in the description which follows, the operands, Q, R, and B are assumed to be 32-bit digital words, each consisting of bits 0-31, with bit 0 of each operand being the most significant bit (MSB), and 31 being the least significant bit (LSB). The invention operates algebraically on these operands to produce intermediate values, Px and Py, each consisting also of 32 bits numbered in descending order of significance from 0-31.

Figure 1:
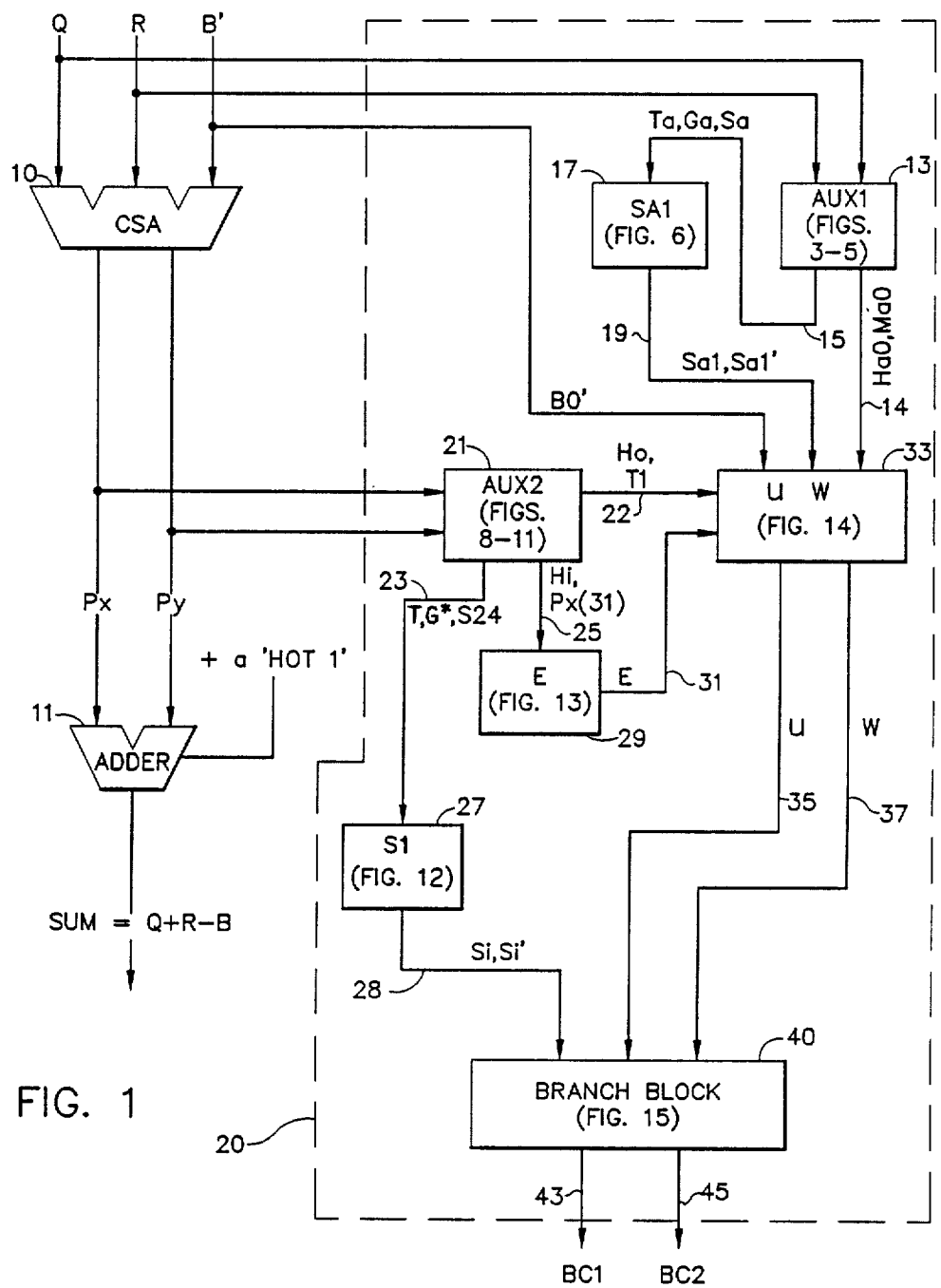
FIG. 1 is a schematic block diagram showing an embodiment of an apparatus of the invention.
Figure 2:
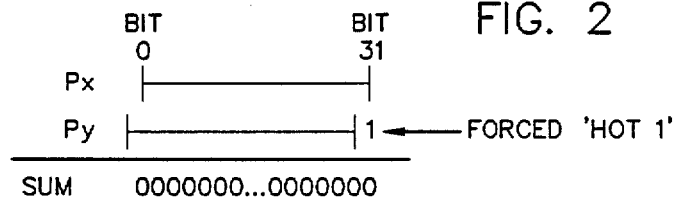
FIG. 2 is a chart showing the relationship of output signals PX and PV of the carry-save-adder 10 in FIG. 1.

FIG. 1 is a block schematic diagram showing the structure and operation of the present invention. Operating in parallel to the invention is an adder circuit including a conventional carry-save adder 10 and a conventional adder 11, which operate to combine the operands Q, R and B using carry-save adder techniques. It is noted that B, the compare value operand, is subtracted from the combination of Q and R by the well-known technique of two's complements addition. In performing two's complement addition, B is provided to the carry-save adder 10 in one's complement form (B'). As is known, the two's complement of B is obtained by adding a one to the one's complement value. The one is added as a "hot" one to intermediate values Px and Py combined in the conventional adder 11.

The invention includes a branch prediction circuit 20, having a first auxiliary (AUX1) circuit block 13 which receives Q and R, and produces intermediate results denoted as HaO and MaO on signal path 14, and intermediate products Ta Ga and Sa on signal path 15. The circuit block 13 is illustrated in greater detail in FIGS. 3-5. An intermediate block 17 (Sal) receives the signals on path 15 and produces a complementary set of intermediate values Sal, and Sal' on signal path 19. The circuit block 17 is shown in detail in FIG. 6. A second auxiliary block (AUX2) 21 receives intermediate values Pxi and Pyi output by the carry-save adder 10 and, in response, produces first intermediate complementary signals H0 and H0' and second intermediate complementary signals T1 and T1' on signal path 22. Additionally, the block 21 produces intermediate values T, G, and S24 on signal path 23. On signal path 25, the auxiliary block 21 provides intermediate values H0–H30 and passes through intermediate value Px31. The circuit block 21 is illustrated in greater detail in FIGS. 8-11. An intermediate value block 27 (S1, illustrated in FIG. 12) produces a pair of complementary signals S1 and S1' on signal line 28 in response to the signals on signal line 23. An intermediate product block 29 (illustrated in FIG. 13) receives the signals on signal path 25 and produces an intermediate value E on signal path 31. Intermediate values U and W are produced by a circuit block 33 on signal paths 35 and 37, respectively, in response to signals provided on signal path 14, 19, 22, 31, and to the most significant digit B0' of the one's-complemented B operand. The circuit block 33 is illustrated in FIG. 14. A circuit block 40 (BRANCH) provides two signals—BRANCH CATEGORY 1 (BC1) and BRANCH CATEGORY 2 (BC2)—on signal lines 43 and 45, respectively, in response to signals on signal paths 28, 35, and 37. This circuit block is illustrated in detail in FIG. 15.

As a preliminary to the detailed description of the structure of the apparatus 20, it is observed that, while the following description assumes 32-bit architecture for structure and operation of the invention, those skilled in the art will understand that the techniques of this invention may be applied to operands of any size (N-bit). Generally, for an N-bit operand, bits are numbered from 0 through N−1, with significance diminishing from 0 (the most significant) through N−1 (the least significant). Further, bit 0 indicates the algebraic sign of the operand, and is called the "sign bit". As with convention, a sign bit of "0" indicates that the operand is zero or a positive number; "1" indicates the operand is negative.

The apparatus of the invention will detect and indicate two branching condition categories: BRANCH CATEGORY 1, and BRANCH CATEGORY 2, each indicated by a respective output of the block 40 in FIG. 1. BRANCH CATEGORY 1 covers the category of branch instructions in which a branch is taken when the incremented current value is greater than the compare value, BRANCH CATEGORY 2 indicates prediction of the outcome of the operation conducted by those branching instructions in which the incremented current value is less than or equal to the compare value.

The discussion to follow provides the detailed description of the apparatus of the invention. For clarification, the following notations will be used:

| | NOTATIONS |
|---|---|
| 1. | A(i) is the i bit in the binary string A |
| 2. | V represents the logical exclusive-OR |
| 3. | B' represents the one's complement of B |
| 4. | · indicates the logical AND |
| 5. | \| represents the logical OR |
| 6. | + represents addition |

BRANCH PREDICTION CATEGORY 2

The BRANCH CATEGORY 2 signal (BC2) indicates the condition of the expression $(A \leq B)$. The signal is digital and its state is determined in the following form:

| |
|---|
| BC2 = 1, $(A \leq B)$ and a branch is to be taken |
| BC2 = 0, $(A \leq B)$ and a branch is not to be taken | where $A = Q + R$, and B is the compare value operand. This formulation can be expressed in the following table:

TABLE 1

| A(0) | B(0)' | $(A \leq B)$? |
|---|---|---|
| 0 | 0 | A > B (always) |
| 0 | 1 | A ≧ B if $SUM_0 = 0$, A < B if $SUM_0 = 1$ |
| 1 | 0 | A ≧ B if $SUM_0 = 0$, A < B if $SUM_0 = 1$ |
| 1 | 1 | A < B (always) |

In Table 1, A0 is the sign bit of the result of Q+R and B0 is the sign bit of the compare operand, and $SUM_0$ is the sign bit of the outcome of the operation Q+R−B. From Table 1, the equation for $A \leq B$ can be written as, $$(A \leq B) = (A_0' \cdot B_0' \cdot SUM_0) | (A_0 \cdot B_0 \cdot SUM_0) | \quad \text{Eq. (1)}$$

$$(A_0 \cdot B_0') | E$$

where, E=1 if A=B $SUM_0$ is the sign bit of the result of a three-way adder operation. Normally, the SUM can be described by the following recursive equations.

$$SUM(i) = A(i) \vee B(i) \vee C(i+1) = H(i) \vee C(i+1), \quad (1a)$$

$$C(i) = G(i) \mid (T(i) \cdot C(i+1)) \text{ with } G(i) = A(i) \cdot B(i) \quad (1b)$$

$$\text{and } T(i) = A(i) \mid B(i),$$

where C(i) denotes the carry generated at bit position i, and H(i), G(i), and T(i) are the well-known half-adder functions of half-sum, generate, and transmit, respectively.

A more elegant and efficient solution for determining the addition of two numbers is disclosed in pending patent Application Ser. No. 066,364, assigned to the assignee of this application and incorporated herein by reference. The equations in Serial No. 066,364 are adapted for this invention as a preferred example only. It will be appreciated by those skilled in the art in light of this specification that the invention can be practiced using any addition scheme such as carry-look-ahead or other addition scheme.

SUM$_0$, as described by the incorporated pending patent application, can be expressed in the following form:

$$SUM_0 = (M(0).S(1)) \mid (H(0).S(1)')$$

where:

$$M(0) = H(0) \vee T(1)$$

M(0) is a signal developed by an exclusive-OR (XOR) gate 50 contained in the circuit block 33, as shown in FIG. 14;

$$H(0) = Px(0) \vee Py(1)$$

Figure 9:
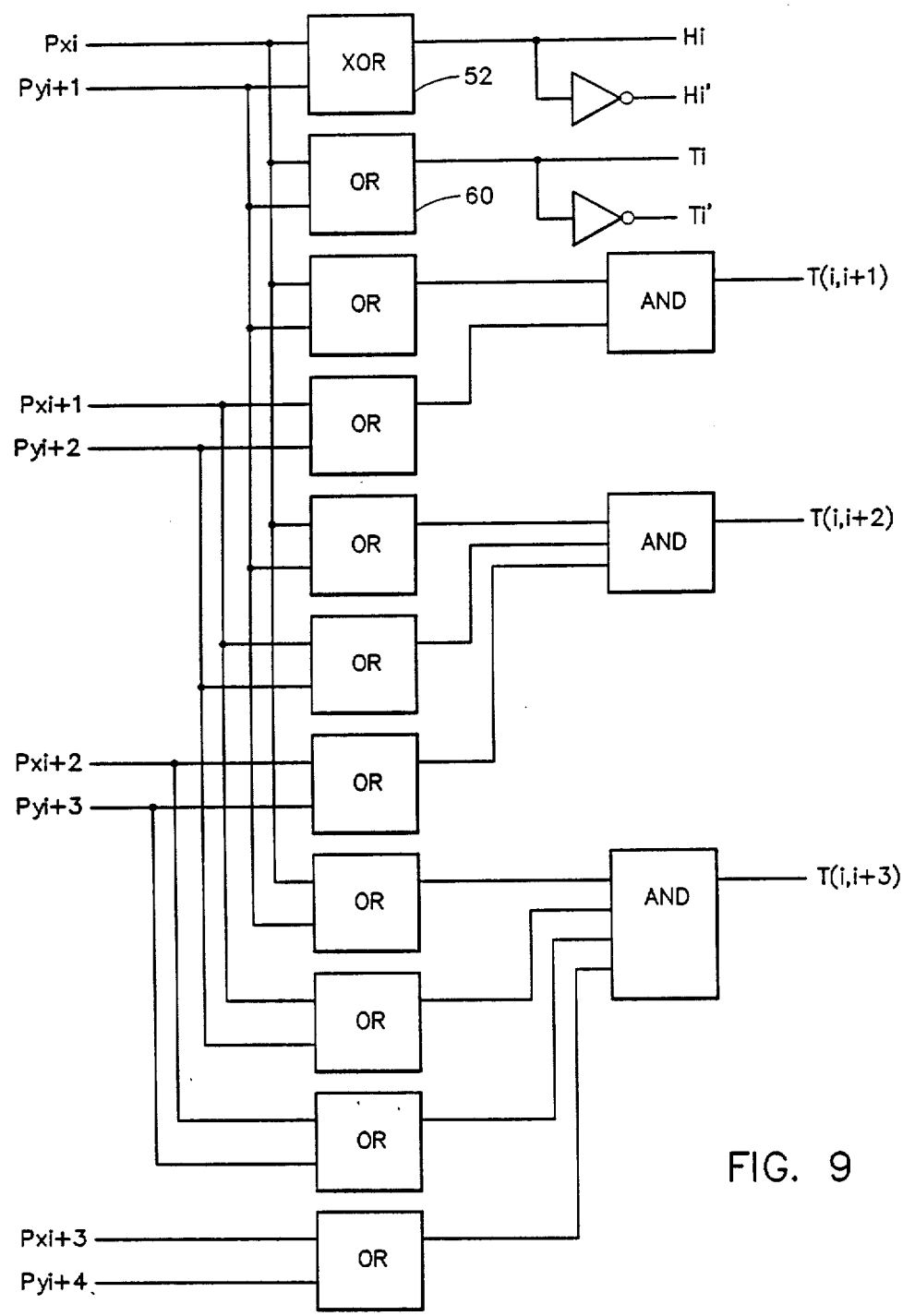
Figure 10:
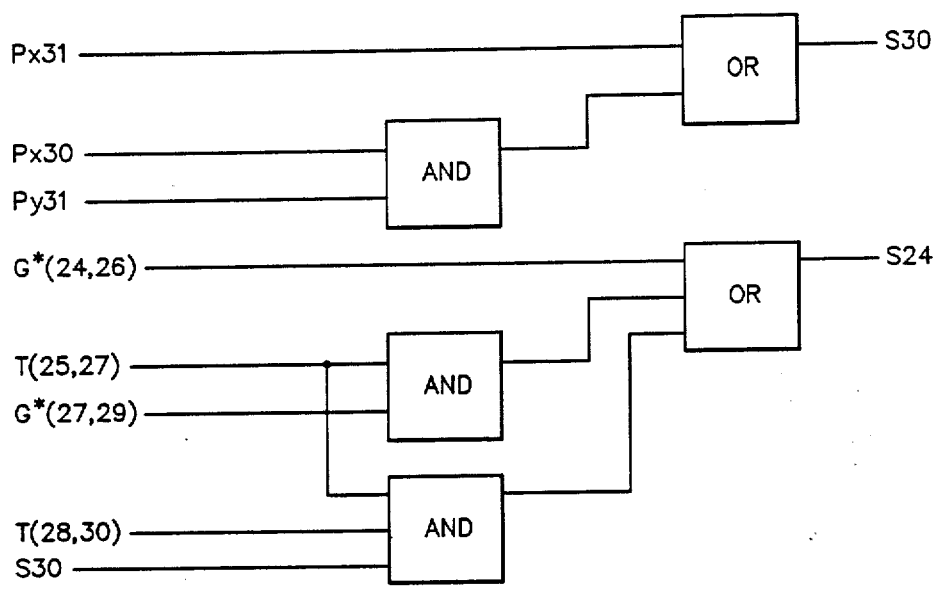
Figure 12:
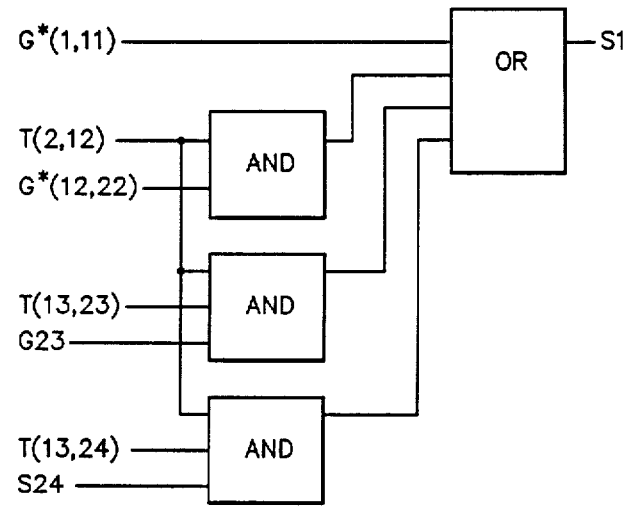
FIG. 12 is a schematic diagram showing the details of element 27 of FIG. 1.

H(0) is a signal developed by an XOR gate 52 included in the AUX2 circuit 21 as shown in FIG. 9;

$$S(1) = G^*(1,m) \mid (T(2,m+1).S(m+1,z))$$

z being some natural number such that m<z, the S(1) relation is embodied in the circuit block 21 whose schematic representation is shown in FIG. 12;

$$G^*(1,m) = G(1) \mid G(2) \mid (T(2) \cdot G(3)) \mid (T(2) \cdot T(3))$$

$$G(4)) \mid \ldots \mid (T(2,m-1) \cdot G(m))$$

Figure 11:
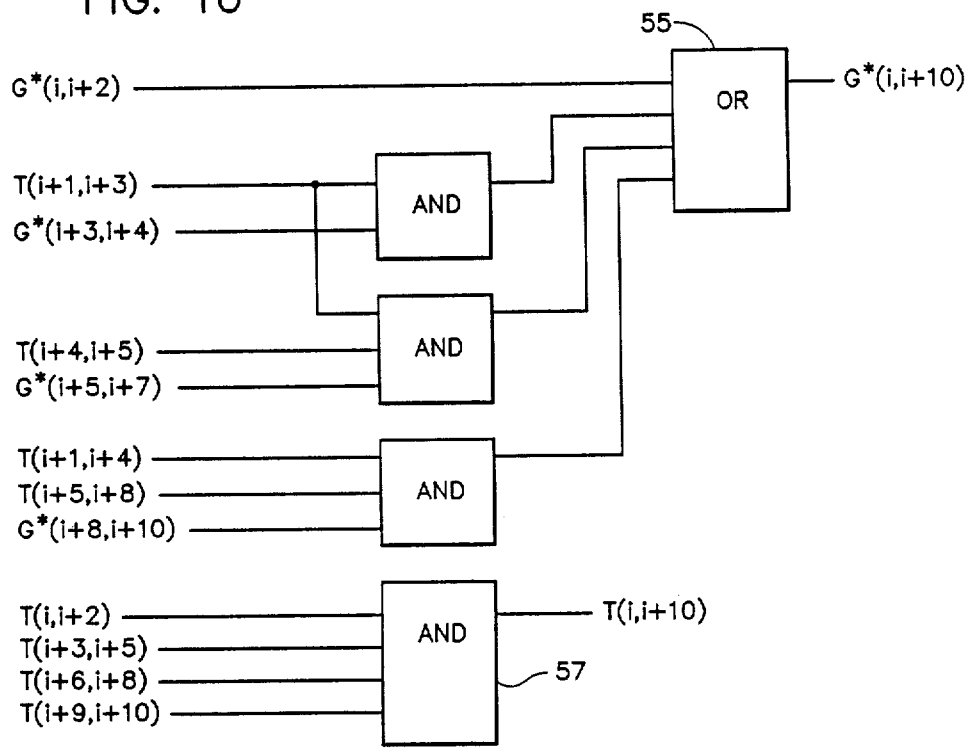

G*(1,m) is produced by an OR gate 55 included in the portion of the circuit block 21 illustrated in FIG. 11;

$$T(2,m+1) = T(2).T(3).T(4).T(5). \ldots Tm\ Tm+1$$

T(2,m+1) is produced in the circuit block 21 by an AND gate such as the gate 57 in FIG. 11;

$$G(1) = Px(1).Py(2)$$

Figure 8:
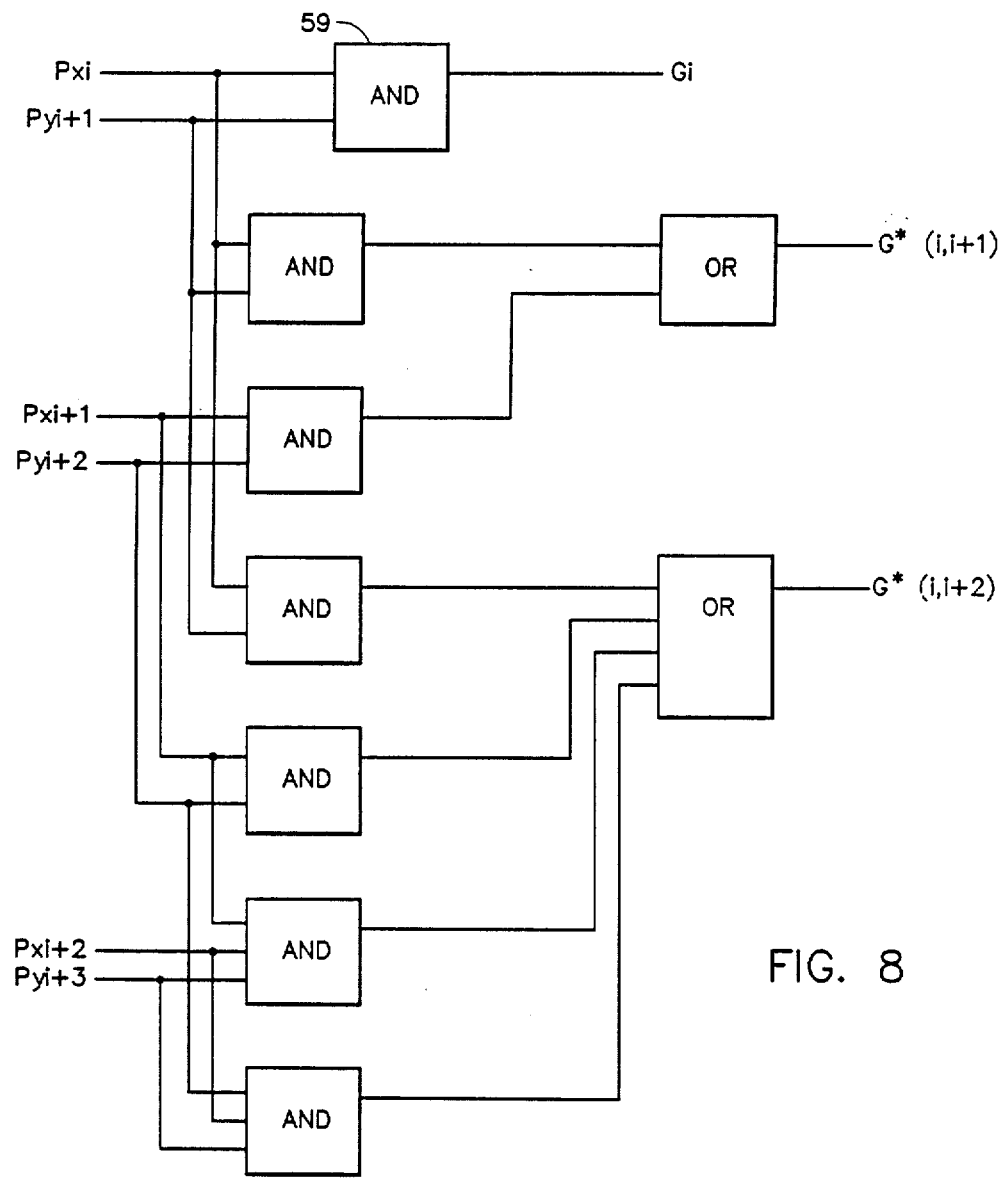
FIGS. 8-11 are schematic diagrams showing the details of a element 21 of FIG. 1.

G(1) is generated in the circuit block 21 by an AND gate such as the gate 59 in FIG. 8; and $$T(1) = Px(1) \mid Py(2)$$

T(1) is generated in the circuit block 21 by an OR gate such as the gate 60 in FIG. 9.

Figure 7:
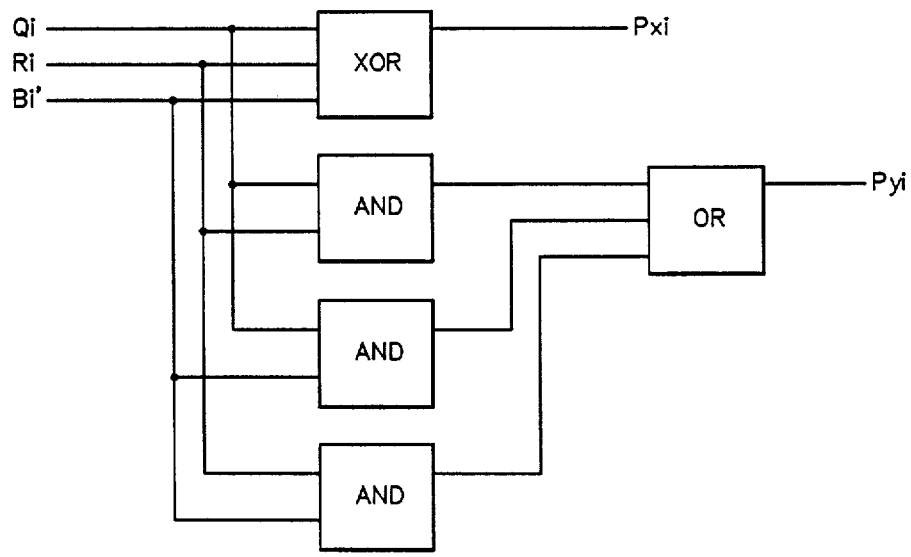
FIG. 7 is a schematic diagram showing the details of the input signals and output signals provided by element 10 of FIG. 1.

Px(i) and Py(i) are computed by the carry-save-adder 10 according to the following equations, which are represented schematically in FIG. 7.

$$Px(i) = Q(i) \vee R(i) \vee B(i)'$$

$$Py(i) = (Q(i).R(i)) \mid (Q(i).B(i)') \mid (R(i).B(i)')$$

Thus, the branch prediction equation for BC2 can be expressed as the following:

$$(1) \Rightarrow$$

$$\begin{aligned}(A \leq B) =\ & (A(0)' \cdot B(0)' \cdot M(0) \cdot S(1)) \mid (A(0)' \cdot B(0)' \cdot \quad (2) \\ & H(0) \cdot S(1)') \mid (A(0) \cdot B(0) \cdot M(0) \cdot \\ & S(1)) \mid (A(0) \cdot B(0) \cdot H(0) \cdot S(1)') \mid \\ & (A(0) \cdot B(0)') \mid E \\ =\ & [(A(0)' \cdot B(0)' \cdot M(0)) \mid (A(0) \cdot B(0) \cdot M(0)) \mid \\ & (A(0) \cdot B(0)') \mid E] \cdot S(1) \mid [(A(0)' \cdot B(0)' \cdot \\ & H(0)) \mid (A(0) \cdot B(0) \cdot H(0)) \mid A(0) \cdot B(0)') \\ & \mid E] \cdot S(1)' \\ =\ & [(B(0)' \cdot M(0)) \mid (A(0) \cdot M(0)) \mid (A(0) \cdot B(0)') \\ & E] \cdot S(1) \mid [(B(0)' \cdot H(0)) \mid (A(0) \cdot H(0) \mid \\ & (A(0) \cdot B(0)' \mid E] \cdot S(1)'\end{aligned}$$

And, since A=Q+R, then from the incorporated patent application, $$A(0) = (Ma(0).Sa(1)) \mid (Ha(0).Sa(1)')$$

where $$Ma(0) = Ha(0) \vee Ta(1)$$

Figure 5:
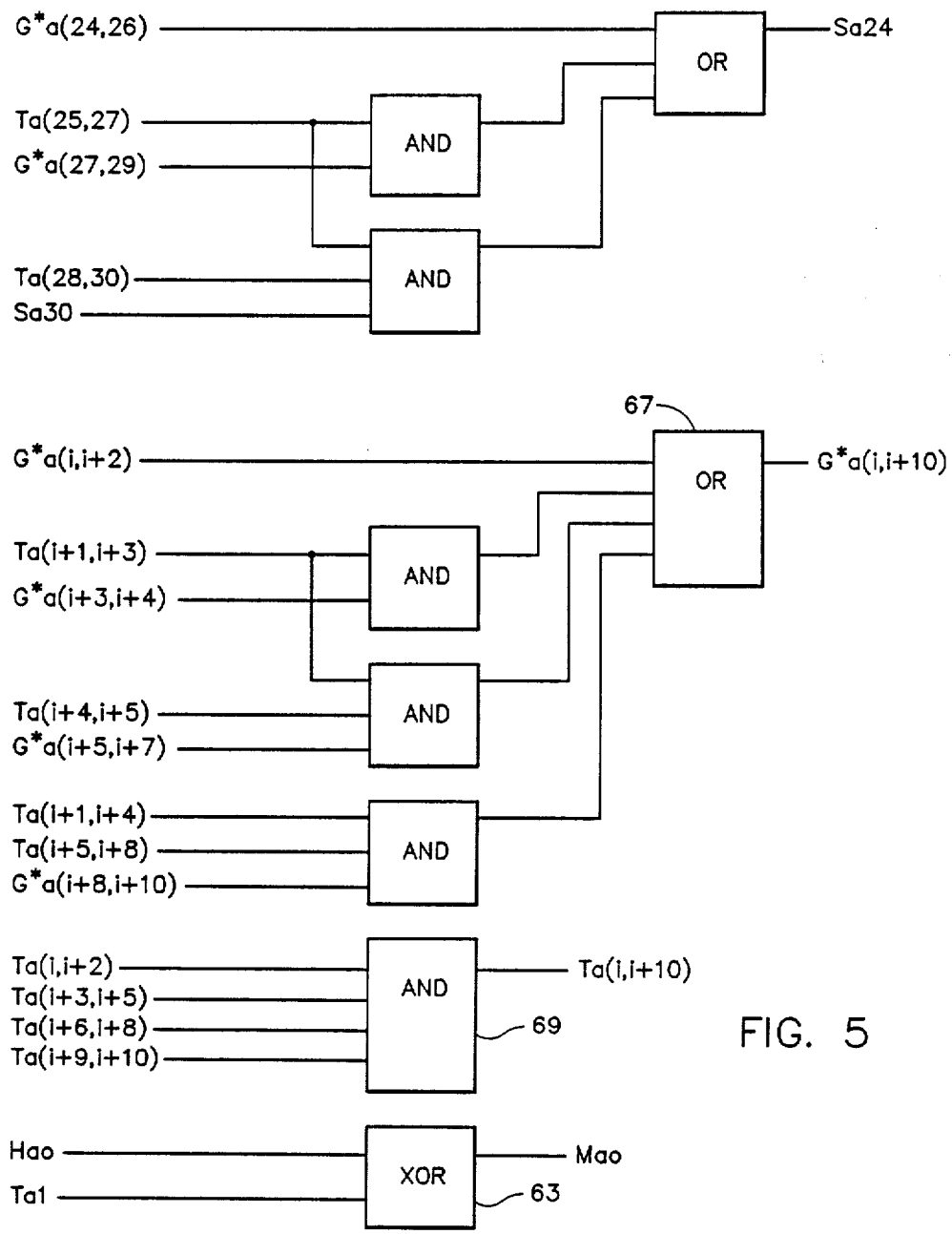

Ma(0) is a signal generated in the circuit block 13 by the XOR gate 63 illustrated in FIG. 5;

$$Ha(0) = Q(0) \vee R(0)$$

Figure 4:
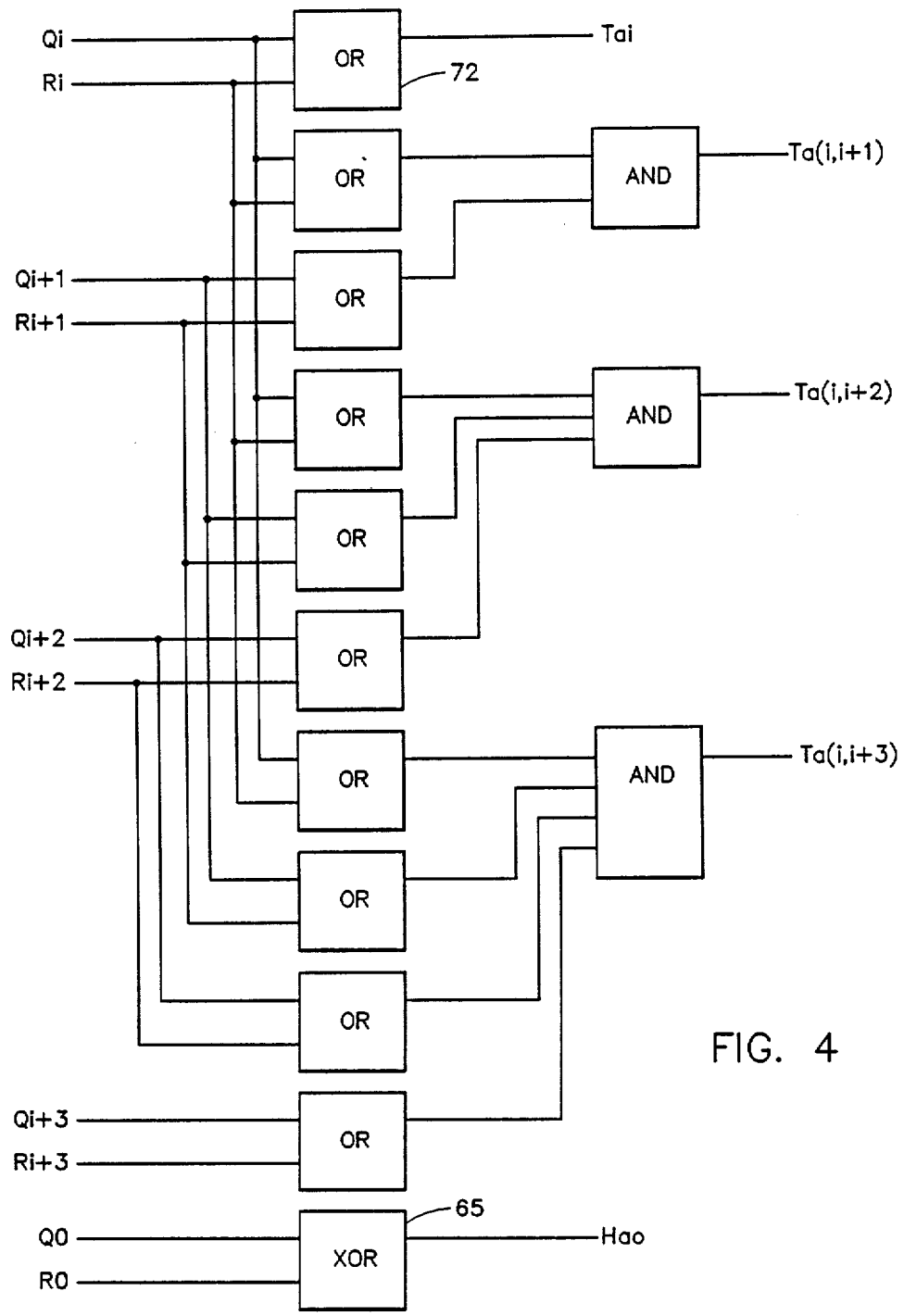
Figure 6:
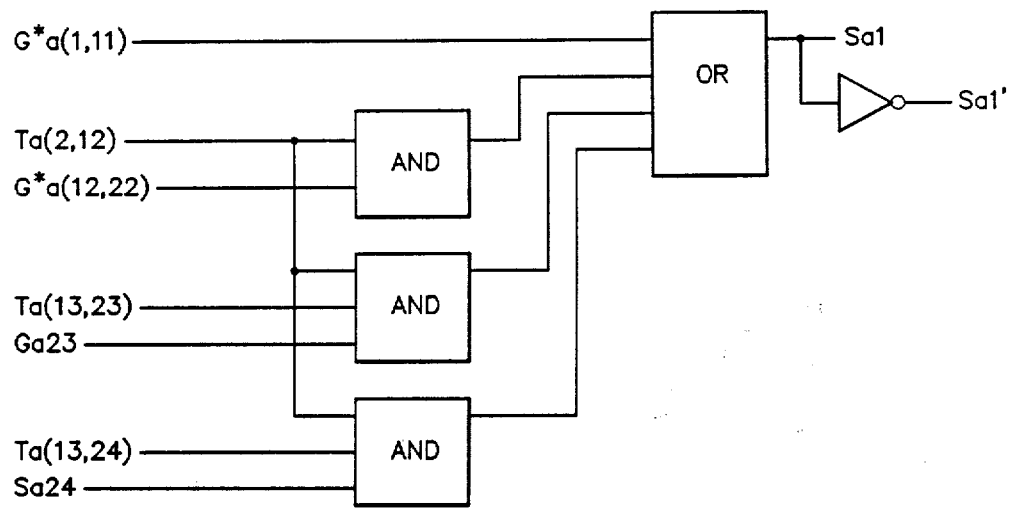
FIG. 6 is a schematic diagram showing the details of element 17 of FIG. 1.

Ha(0) is generated in the circuit block 13 by the XOR gate 65 illustrated in FIG. 4;

$$Sa(1) = G^*a(1,m)\ (Ta(2,m+1).Sa(m+1,z)),$$

z being some natural number such that m<z, Sa(1) is embodied in the circuit block 17, whose schematic representation is shown in FIG. 6;

$$G^*a(1,m) = Ga(1) \mid Ga(2) \mid (Ta(2).Ga(3)) \mid$$

$$(Ta(2).Ta(3).Ga(4)) \mid \ldots \mid (Ta(2,m-1).Gam))$$

G*a(1,m) is generated in the circuit block 13 by an OR gate such as the gate 67 in FIG. 5;

$$Ta(2,m+1) = Ta(2).Ta(3).Ta(4).Ta(5). \ldots$$
$$Ta(m).Ta(m+1)$$

Ta(2,m+1) is generated in circuit block 13 by an AND gate such as the gate 69 in FIG. 5;

$$Ga(1) = Q(1).R(1)$$

Figure 3:
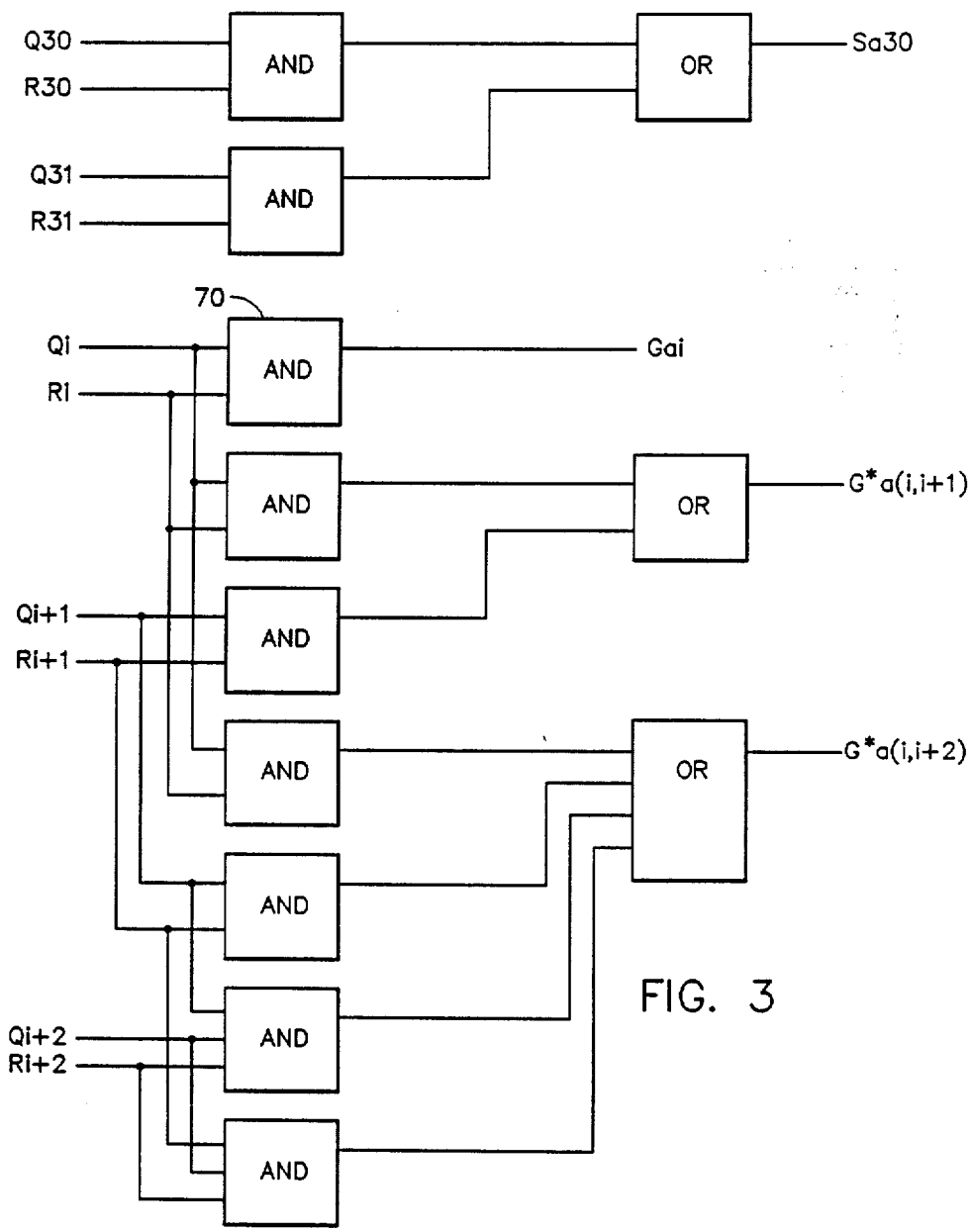
FIGS. 3-5 are schematic diagrams showing the details of elements of FIG. 1.

Ga(1) is generated in circuit block 13 by an AND gate such as the gate 70 in FIG. 3; and $$Ta(1) = Q(1) \mid R(1)$$

Ta(1) is generated in the circuit block 13 by an OR gate such as the gate 72 in FIG. 4. Then, (2) =>

$(A \leq B) = [(B(0)' \cdot M(0)) \mid (Ma(0) \cdot Sa(1) \cdot M(0)) \mid (Ha(0) \cdot Sa(1)' \cdot M(0)) \mid (Ma(0) \cdot Sa(1) \cdot B(0)') \mid (Ha(0) \cdot Sa(1)' \cdot B(0)') \mid E] \cdot S(1)$ $\mid [(B(0)' \cdot H(0)) \mid (Ma(0) \cdot Sa(1) \cdot H(0)) \mid (Ha(0) \cdot Sa(1)' \cdot H(0)) \mid (Ma(0) \cdot Sa(1) \cdot B(0)') \mid (Ha(0) \cdot Sa(1)' \cdot B(0)') \mid E] \cdot S(1)'$ $= [((Ma(0) \cdot M(0)) \mid (Ma(0) \cdot B(0)')) \cdot Sa(1) \mid ((B(0)' \cdot M(0)) \mid E$ $\mid (Ha(0) \cdot M(0)) \mid (Ha(0) \cdot B(0)')) \cdot Sa(1)'] \cdot S(1)$ $\mid [((Ma(0) \cdot H(0)) \mid (Ma(0) \cdot B(0)')) \cdot Sa(1) \mid (B(0)' \cdot H(0)) \mid E$ $\mid ((Ha(0) \cdot H(0)) \mid (Ha(0) \cdot B(0)')) \cdot Sa(1)'] \cdot S(1)'$ $(A \leq B) = [(Ma(0) \cdot (M(0) \mid B(0)') \cdot Sa(1)) \mid (Ha(0) \cdot (M(0) = B(0)') \cdot Sa(1)' \mid (B(0)' \cdot M(0)) \mid E] \cdot S(1)$ \quad (3)

$\mid [(Ma(0) \cdot (H(0) \mid B(0)') \cdot Sa(1)) \mid (Ha(0) \cdot (h(0) \mid B(0)') \cdot Sa(1)') \mid (B(0)' \cdot H(0)) \mid E] \cdot S(1)'$ The equality of A=B, (E), can be determined directly from the outputs of the carry-save-adder 10. The two outputs Px and Py can be expressed as shown below, as they are presented for the addition to the two-way adder.

By definition, E=1 if and only if Q+R=B. Or, expressed in a different manner, E=1 if and only if Q+R−B=0, i.e., SUM=0. However, the only way that the SUM can be equal to zero, is if Px(31) is equal to 1 and all the other corresponding bits of Px and Py are opposite in value (if Px(O)=1, then Py(1) must =0, etc.), i.e., H(i)=1 for every (i), where H(i)=Px(i) V Py(i+1) H(i) is generated in the AUX2 circuit block 21 by an XOR gate such as the gate 52 in FIG. 9. Therefore, E can be expressed by:

E=Px(31).H(0).H(1).H(2) . . . . . H(30)

Figure 13:
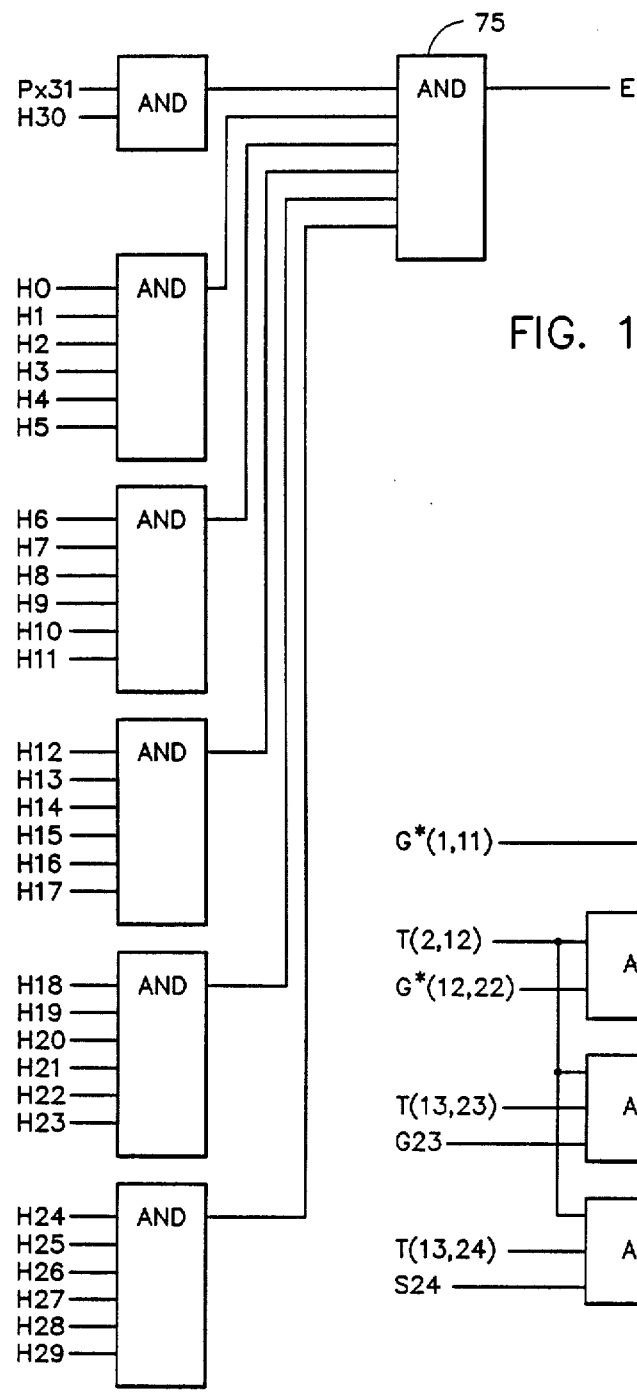
FIG. 13 is a schematic diagram showing the details of element 29 of FIG. 1.
Figure 14:
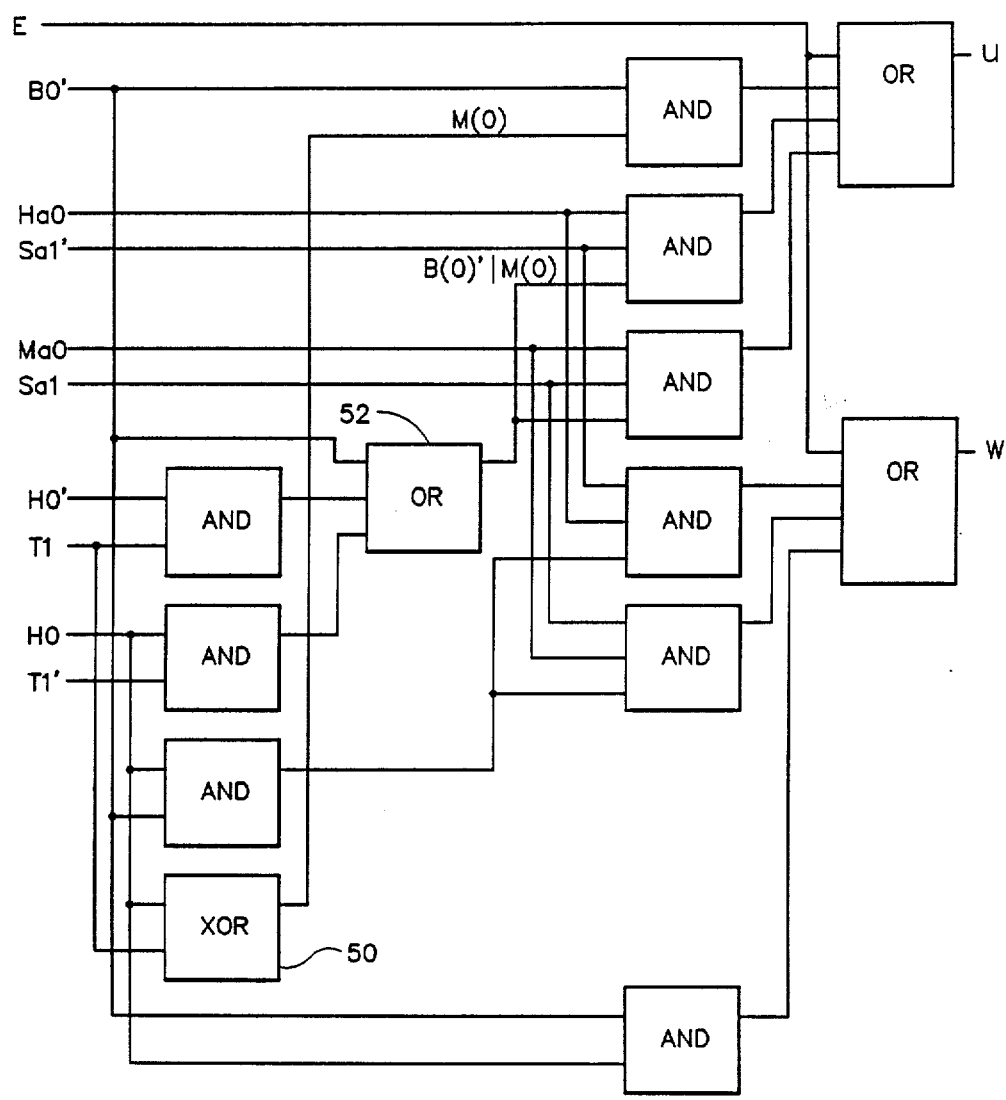
FIG. 14 is a schematic diagram showing the details of element 23 of FIG. 1.

In the invention, E is generated by the E circuit block 29 through the AND gate 75 in FIG. 13, which implements the expression for E given above.

Thus, equation (3) (with the expression for E substituted into it) predicts the outcome of the category 2 instructions from the Q, R and B inputs directly.

BRANCH PREDICTION CATEGORY 1

It is a simple matter to derive the expression for the prediction of the outcome of the category 1 instructions. Analogous results can be achieved by applying the same methodology described previously, however, such methodology will result in more hardware and slightly longer circuit delay than the implementation of the category 1 branch determination. The easiest method would be to directly invert the output presented by equation (3). Depending on the technology used for the implementation, such a scheme may or may not result in penalizing the overall delay, and in addition, needs negligible hardware for its implementation. This method is presented as follows. If a signal U, given by:

$U = [Ma(0) \cdot (M(0) \mid B(0)') \cdot Sa(1)] \mid [Ha(0) \cdot (M(0) \mid B(0)') \cdot Sa(1)'] \mid (B(0)' \cdot M(0)) \mid E$ and, a signal W, given by:

$W = [Ma(0) \cdot (H(0) \mid B(0)') \cdot Sa(1)] \mid [Ha(0) \cdot (H(0) \mid B(0)') \cdot Sa(1)'] \mid (B(0)' \cdot H(0)) \mid E$ are developed in the UW circuit block 33 by the circuit of FIG. 14, which embodies these expressions, then the branch condition signals BC1 and BC2 are realized from the expressions for U and W. In the order BC2 and BC1, the signals are given by equations (4) and (5), where:

(3)=>the category 2 outcome is as follows:

(4) $(A \leq B) = (U.S(1)) \mid (W.S(1)')$ and, therefore, the outcome of the category 1 instruction is as follows.

(5) $(A > B) = [(U.S(1)) \mid (W.S(1)')]'$

Figure 15:
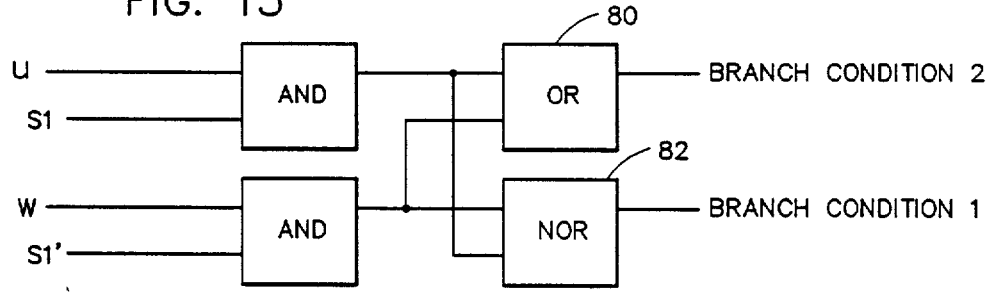
FIG. 15 is a schematic diagram showing the details of element 40 of FIG. 1.

These two equations are embodied in the OR gate 80 and NOR gate 82, respectively, in the branch block circuit which is illustrated in FIG. 15.

The following are final equations for predicting the outcome of the CATEGORY 2 branch instructions. In order to predict the outcome of the CATEGORY 1 instructions, an inversion of the final stage need only be performed. All the equations are represented in the logic diagrams of FIGS. 3–15.

The following equations will compute the branch outcome with prediction from the inputs Q, R, and B'.

$(A \leq B) = [(Ma(0) \cdot (M(0) \mid B(0)') \cdot Sa(1)) \mid (Ha(0) \cdot (M(0) \mid B(0)') \cdot Sa(1)' \mid (B(0)' \cdot M(0)) \mid E] \cdot S(1)$ $\mid [(Ma(0) \cdot (H(0) \mid B(0)') \cdot Sa(1)) \mid (Ha(0) \cdot (H(0) \mid B(0)') \cdot Sa(1)') \mid (B(0)' \cdot H(0)) \mid E] \cdot S(1)'$ where $M(0) = H(0) \; V \; T(1) \; H(0) = Px(0) \; V \; Py(1)$ $S(1) = G^*(1,m) \mid (T(2,m+1) \cdot S(m+1,z))$ z being some natural number such that m<z.

$G^*(1,m) = G(1) \mid G(2) \mid (T(2) \cdot G(3)) \mid (T(2) \cdot t(3) \cdot g(4))$ $\mid \ldots \mid (T(2,m-1) \cdot G(m))$ $T(2,m+1) = T(2) \cdot T(3) \cdot T(4) \cdot T(5) \cdot \ldots \cdot T(m) \cdot T(m+1)$ $G(1) = Px(1) \cdot Py(2) \; T(1) = Px(1) \mid Py(2)$ $Px(i) = Q(i) \; V \; R(i) \; V \; B(i)'$ $Py(i) = (Q(i) \cdot R(i)) \mid (Q(i) \cdot B(i)') \mid (R(i) \cdot B(i)')$ $Ma(0) = Ha(0) \; V \; Ta(1)$ $Ha(0) = Q(0) \; V \; R(0)$ $Sa(1) = G^*a(1,m) \mid (Ta(2,m+1) \cdot Sa(m+1,z))$ z being some natural number such that m<z.

$G^*a(1,m) = Ga(1) \mid Ga(2) \mid (Ta(2) \cdot Ga(3)) \mid (Ta(2) \cdot$

-continued $$Ta(3) \cdot Ga(4)) | \ldots | (Ta(2,m-1) \cdot Ga(m))$$

$$*Ta(2,m+1) = Ta(2) \cdot Ta(3) \cdot Ta(4) \cdot$$

$$Ta(5) \cdot \ldots \cdot Ta(m) \cdot Ta(m+1)$$

$$Ga(1) = Q(1) \cdot R(1) \; Ta(1) = Q(1) | R(1)$$

$$E = Px(31) \cdot H(0) \cdot H(1) \cdot H(2) \cdot \ldots \cdot H(30) \text{ and } H(i) = Px(i) \; V$$

$$Py(i+1)$$

Q, R, and B are the operands of the instruction, B being the comparison operand.

The operation of prediction circuit 20 is described above with regard to FIGS. 3–15. As shown in FIG. 15, the output 45 of BRANCH block 40 of FIG. 1 provides a BRANCH CATEGORY 2 signal which provides a logical one when A is less than or equal to B and a logical zero when A is greater than B, while the other output 43 provides the complement of this signal. Thus, branch prediction circuit 20 of FIG. 1 determines the outcome of the branching condition using fewer gate levels than a two-step addition system thereby speeding the branch prediction instruction.

The described embodiments of the present invention provide logic circuitry to determine the validity of a condition which is then used by a computer to perform other operations such as branching. The prediction uses a first operand, an increment operand, and a compare operand as input signals. Because the invention determines a condition directly from the input operands, the outcome may be computed at the same time as the first operand is being incremented. In addition, no subtraction of the comparison value from the increment result must be performed because the comparison result is not required to perform the prediction. Because of this direct computation, the prediction result may be determined in one machine cycle.

The present invention provides a combinational logic circuit which determines whether the combination of operands provided to the logic circuit indicates the condition whether a branch is to occur or not. The combinational circuit is based upon six comparisons. If the sign bit of a SUM of an operand Q and the increment operand R indicates a positive number, and the sign bit of the comparison operand B indicates a negative number, the SUM of Q and R, hereafter called A, is always greater than B; if the sign bit of both A and B indicate positive numbers and the sign bit of the the combination of B subtracted from the SUM of Q and R, hereafter called $SUM_0$, indicates a positive number, A is greater than or equal to B: if the sign bit of both A and B indicate positive numbers and $SUM_0$ indicates a negative number, A is less than B; if the sign bit of both A and B indicate negative numbers and $SUM_0$ indicates a positive number, A is greater than or equal to B; if the sign of both A and B indicate negative numbers and $SUM_0$ indicates a negative number, A is less than B; if the sign of A indicates a negative number and the sign of B indicates a positive number, then A is less than B.

By determining only the minimum required intermediate operands, and by a novel approach to the determination of the result equal to zero, speed is enhanced in the determination of the branching condition. In addition, by using intermediate products from a three input adder, hardware requirements are minimized.

What is claimed is:

1. In a computing system which executes a multipath sequence of instructions including a branching instruction by producing and manipulating signed, N-bit operands, and includes an arithmetic/logic unit for executing said branching instruction by subtraction of a compare operand, B, having a sign bit B(0), from the sum of a current value operand, Q, having a sign bit Q(0) and an operand, R, having a sign bit R(0), wherein the improvement to said computing system is for predicting the outcome of the execution of said branching instruction concurrently with said execution, the improvement comprising:

first logic circuit means receiving said operands Q and R for determining a sign bit, A(0), of the SUM of said operand Q and said operand, R;

means for providing said operand B in complement format;

a carry-save-adder receiving said operands Q and R and the one's complement of said operand B, said carry-save-adder for providing two N-bit output signals, Px and Py, said carry-save-adder including logic gates for producing Px and Py by executing the formula $$Px(i) = Q(i) \; V \; R(i) \; V \; B(i)'$$

and the formula, $$Py(i) = (Q(i).R(i)) | (Q(i).B(i)') | (R(i).B(i)')$$

where
Q(i) is the ith bit of operand Q,
R(i) is the ith bit of operand R,
B(i)' is the ith bit of the one's complement of operand B,
Px(i) is the ith bit of said output signal Px,
Py(i) is the ith bit of said output signal Py and
i is an integer, and $0 \leq i \leq N-1$;

second logic circuit means connected to said carry-save-adder and responsive to Px and Py for determining the sign bit $SUM_0$, resulting from the subtraction of said operand B from the SUM of said operands Q and R;

third logic circuit means connected to said carry-save-adder for determining when the SUM of operands Q and R is equal to operand B, said third logic circuit means including logic gates for executing the equation $$E = (Px(0) \; V \; Py(1)) \; (Px(1) \; V \; Py(2)) \ldots$$
$$(Px(N-2) \; V \; Py(N-1)) \; Px(N-1)$$

where E is a logical one when said SUM is equal to operand B,

N is an integer equal to the numb of bits in Px and Py, and 0 is the most significant bit of Px and Py; and branch block circuit means connected to said first, second, and third logic circuit means for determining if said third binary word subtracted from the SUM of said first and second binary words is less than or equal to zero, said means including logic gates for executing the formula:

$$(A \leq B) = (A(0)'.B(0)'.SUM(0)) | (A(0).B(0).SUM(0))$$
$$| (A(0).B(0)') | E$$

where ($A \leq B$) is a logical one when said third binary word being subtracted from the SUM of said first and second binary words is less than or equal to zero.

$A(0)'$ is the inverse of $A(0)$, and $B(0)'$ is the inverse of $B(0)$.

2. The improvement of claim 1, wherein said data processing systems alters said series of instructions in response to said variable ($A \leq B$).

3. The improvement of claim 1, wherein said first logic circuit means includes logic gates for executing the equation:

$$A(0) = (Ma(0).Sa(1)) | (Ha(0).Sa(1)')$$

where $Ma(0) = Ha(0) \ V \ Ta(1)$
$Ha(0) = Q(0) \ V \ R(0)$
$Sa(1) = G^*a(1,m) | (Ta(2,m+1) \ Sa(m+1,z))$
Z being some natural number such that $m < z$.

$$G^*a(1,m) = Ga(1) \ | \ Ga(2) \ | \ (Ta(2) \cdot Ga(3)) \ |$$

$$(Ta(2) \cdot Ta(3) \cdot Ga(4)) \ | \ldots | \ (Ta(2,m-1) \cdot Ga(m))$$

$$Ta(2,m+1) = Ta(2) \cdot Ta(3) \cdot Ta(4) \cdot Ta(5) \cdot \ldots \cdot Ta(m+1)$$

$$Ga(1) = Q(1) \cdot R(1)$$

and $Ta(1) = Q(1) | R(1)$

4. The improvement of claim 1, where said second logic circuit means includes logic gates executing the equation:

$SUM_0 = (M(0).S(1)) | (H(0).S(1)')$ where $M(0) = H(0) \ V \ T(1)$
$H(0) = Px(0) \ V \ Py(1)$
$S(1) = G^*(1,m) | (T(2,m+1).S(m+1,z))$
z being some natural number such that $m < z$.
$G^*(1,m) = G(1) | G(2) | (T(2).G(3)) | (T(2).T(3).G(4)) | \ldots | (T(2,m-1).G(m))$
$T(2,m+1) = T(2).T(3).T(4).T(5). \ldots . T(m)T(m+1)$
$G(1) = Px(1).Py(2)$, and
$T(1) = Px(1) | Py(2)$ 5. The improvement of claim 1, where said third logic circuit means includes logic gates executing the equation:

$$E = [Px(N-1).H(0).H(1). \ldots .H(N-2)]$$

where $H(i) = Px(i) \ V \ Py(i+1)$

6. An apparatus for predicting the outcome of an executing branching instruction process in which N-bit operands Q, R, and B, having sign bits $Q(0)$, $R(0)$, and $B(0)$, respectively, are combined according to the relationship:

A-B, where $A = (Q+R)$;

and, wherein a first program branch condition signal, BC1, occurs when $(A-B) > 0$, and a second program branch condition signal, BC2, occurs when $(A-B) \leq 0$, said apparatus comprising:

carry-save circuit means for generating signals $Px(i)$ and $Py(i)$ by logically combining respective bits of operands Q, R, and B, according to: $Px(i) = Q(i) \ V \ R(i) \ V \ B(i),'$ and $Py(i) = (Q(i).R(i)) | (Q(i).B(i)') | (R(i).B(i)')$; second circuit means connected to said carry-save circuit means for logically combining said signals $Px(i)$ and $Py(i)$ to produce a signal, $SUM_0$, indicating the sign of A-B;

third circuit means responsive to operands Q and R for logically combining respective bits of operands Q and R to produce a signal, AO, indicating the sign of A;

fourth circuit means connected to said carry-save circuit means for logically combining said signals $Px(i)$ and $Py(i)$ to produce a signal, E, indicating $A = B$;

means in said third circuit means for providing the complement of A0, said complement signified by A0';

a first gate means connected to said second, third, and fourth circuit means for generating a first condition signal, BC1, indicating said first program branch condition, said first gate means generating BC1 according to:

$BC1 = [(AO' \cdot BO' \cdot SUM_0) | (AO \cdot BO \cdot SUM_0)|$ $(AO \cdot BO') | E]$; and a second gate means connected to said second, third, and fourth circuit means for generating a second condition signal, BC2, indicating said second program branch condition, said second gate means generating BC2 according to:

$BC2 = [*AO'.BO'.SUM_0) | (AO.BO.SUM_0) | (AO.BO') | E]$.

* * * * *

UNITED STATES PATENT AND TRADEMARK OFFICE
CERTIFICATE OF CORRECTION

PATENT NO. : 4,914,579

DATED : April 3, 1990

INVENTOR(S) : Putrino et al

It is certified that error appears in the above-identified patent and that said Letters Patent is hereby corrected as shown below:

Col. 2, line 3, please insert --consistent with the duty of disclosure under 37 CFR 1.56, the following co-pending applications are provided: 07/157,500 filed on 2-17-88; 07/185,581 filed on 4-25-88 and 07/185,759 filed on 4-25-88--

Claim 1, Col. 10, line 55, please change "numb" to --number--

Claim 2, Col. 11, line 8, please change "systems" to --system--

Claim 6, Col. 12, line 18, please delete "-" at end of line; and
    line 50, please change "*" to --(--

Signed and Sealed this

Seventeenth Day of September, 1991

Attest:

HARRY F. MANBECK, JR.

*Attesting Officer*  *Commissioner of Patents and Trademarks*